United States Patent [19]

Weber

[11] Patent Number: 4,856,288
[45] Date of Patent: Aug. 15, 1989

[54] REFRIGERANT ALERT AND AUTOMATIC RECHARGING DEVICE

[76] Inventor: Robert C. Weber, 57 Dunbar Rd., Palm Beach Gardens, Fla. 33418

[21] Appl. No.: 650,178

[22] Filed: Sep. 13, 1984

Related U.S. Application Data

[63] Continuation-in-part of Ser. No. 514,642, Jul. 18, 1983, abandoned.

[51] Int. Cl.$^4$ .................... G01K 13/00; F16K 31/18
[52] U.S. Cl. ........................... 62/129; 62/149; 137/412; 73/308
[58] Field of Search ............... 62/126, 129, 174, 149; 73/308, 319; 137/412, 559

[56] References Cited

U.S. PATENT DOCUMENTS

| | | | |
|---|---|---|---|
| 1,376,519 | 5/1921 | Du Laney | 137/412 X |
| 2,893,217 | 7/1959 | Nigro | 62/126 |
| 3,059,443 | 10/1962 | Garner | 62/126 |
| 3,668,882 | 6/1972 | Sarsten et al. | 62/77 |
| 3,826,104 | 7/1974 | Lamb et al. | 62/149 |
| 4,308,725 | 1/1982 | Chiyoda | 62/129 |

Primary Examiner—William E. Wayner
Attorney, Agent, or Firm—Macdonald J. Wiggins

[57] ABSTRACT

A sensor for sensing the quantity of refrigerant in a closed loop refrigeration system, with the sensor having attachment means on a lower portion thereof such that it may be installed in direct communication with the refrigerant line of the refrigeration system. The sensor has a hollow interior portion defined by generally cylindrical sidewalls, in which interior portion a float of conductive material is disposed, with the float being free to rise on the surface of liquid refrigerant entering the interior of the sensor from the refrigerant line. At least one electrode is disposed in the interior of said sensor, in a position such that it will be contacted by the float at the time a certain refrigerant level is reached in the interior of the sensor. The electrode forms a part of an electrical circuit configured and arranged to perform a specific control function, with such electrical circuit being completed to perform that control function at the time the certain refrigerant level is reached, this being as a consequence of electrical contact of the float with the electrode. The control function can include the providing of an alarm to the operator of the system, or the automatic addition of refrigerant to the system as needed, and in controlled amounts.

15 Claims, 9 Drawing Sheets

FIG. 17
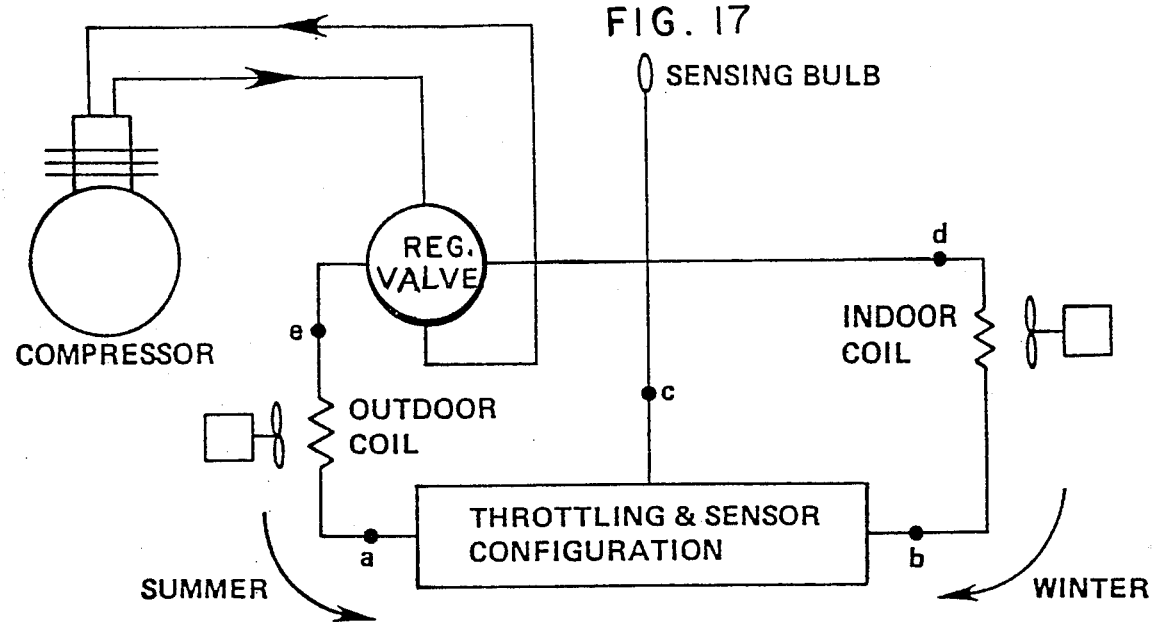
SUMMER ← → WINTER
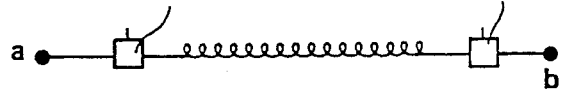
FIG. 18A
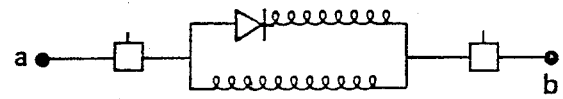
FIG. 18B
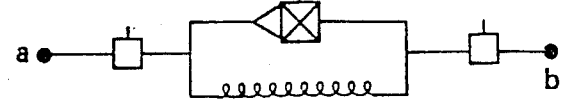
FIG. 18C
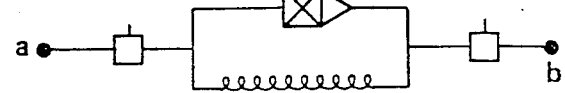
FIG. 18D
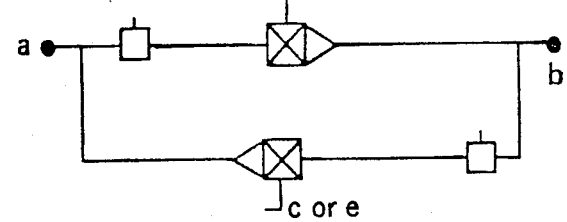
FIG. 18E
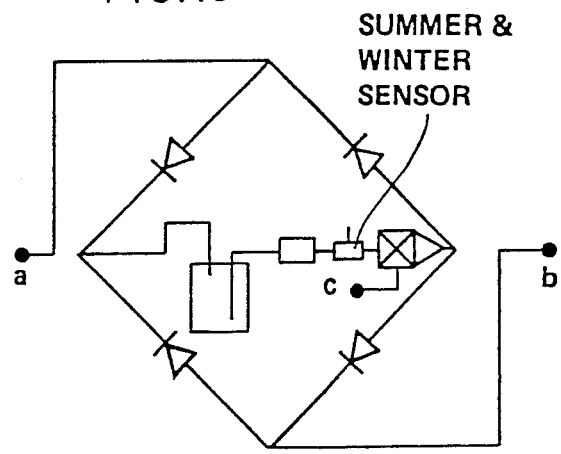
FIG. 18F
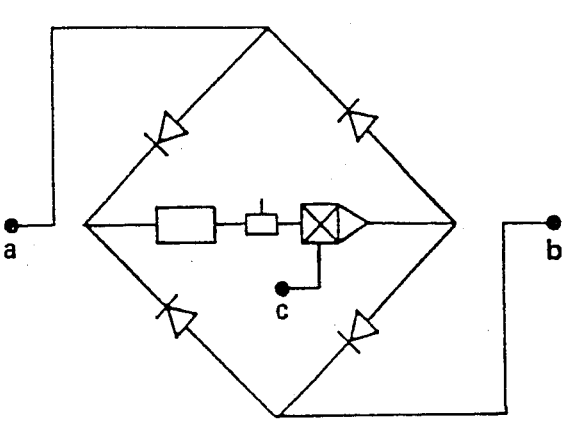
FIG. 18G

REFRIGERANT ALERT AND AUTOMATIC RECHARGING DEVICE

RELATIONSHIP TO PENDING APPLICATION

This is a Continuation-in-Part of my pending application "Refrigerant Loss Indicator", Ser. No. 514,642, filed July 18, 1983 now abandoned.

BACKGROUND OF THE INVENTION

This device relates to devices for measuring the level of refrigerant in a refrigeration system, and more particularly, to a device for indicating loss of the refrigerant and for automatically recharging the system.

A common problem relating to refrigeration systems is the determination of the correct amount of refrigerant in the system. Prior to starting the refrigeration system, the proper amount of refrigerant can sometimes be placed in the system by weighing the refrigerant. This method will work if the system's configuration is known precisely, including the length and size of all the lines in the system. In many systems, for example, home air conditioning systems with self-contained or remote units, these parameters are not known and would be cumbersome to measure. Therefore, a more direct method is needed to determine whether the correct amount of refrigerant is present in the system.

Another problem results from the loss of refrigerant from a system after the system is in operation. For example, a leak may develop which causes refrigerant to escape from the system. The refrigerant leak in a refrigeration system may be exiguous and slow in its loss of refrigerant. In such situations, the system may continue to operate for many weeks or months having an insufficient amount of refrigerant. When the system becomes low in refrigerant, the compressor continues to run with increasing duration, as the compressor must operate longer to compensate for the lack of refrigerant. The increased running of the compressor results in more electrical energy being used, and, in water-cooled systems, more water being used. In some cases, the stress placed upon the compressor can cause the motor to break down the oil and contaminate the entire system, thus necessitating expensive repairs if not component replacement.

Devices for measuring the level of liquids are known. For example, G. L. Koester U.S. Pat. No. 4,087,706 relates to a controller which uses a float as a contact with a pair of electrodes for controlling a liquid level.

Devices and systems for measuring quantities of refrigerant in a refrigerant system and recharging the system are also known. J. G. Nigro U.S. Pat. No. 2,893,217 describes a device for measuring the amount of refrigerant in the receiver of a refrigeration system. To function properly, the valve shown in Nigro must be located at the level of the receiver, and hence is restricted to those refrigeration systems having receivers. The Nigro patent also discloses the use of an automatic refrigerant charging system. Johnson et al U.S. Pat. No. 3,400,552 and Lamp et al U.S. Pat. No. 3,826,104 also disclose automatic charging systems for refrigeration units.

Arf U.S. Pat. No. 2,689,463 discloses an automatic refrigerant charging systems which uses a meter to control the amount of refrigerant being introduced into the refrigerating system. J. J. Talbot U.S. Pat. No. 3,729,949, R. A. Johnson U.S. Pat. No. 3,400,552 and Sarsten et al U.S. Pat. No. 3,668,882 relate to devices which measure the pressure and temperature of a refrigeration system and use these quantities to compute the amount of refrigerant in the system. These systems compute the amount of refrigerant using the perfect gas law or Van der Wall's equation, rather than directly measuring the quantity of refrigerant.

The Chiyoda U.S. Pat. No. 4,308,725 is a refrigerant quantity detecting device for the air conditioning of vehicles, and features a sensor utilizing a floating ball, with the arrangement being such that the sensing means has resistance to shocks and vibrations. However, the Chiyoda device is clearly limited to installation in the receiver of an air conditioning system, which imposes a definite limit as to the applicability of that invention inasmuch as in many refrigeration systems, no receiver is used. Instances of this include a capillary tube system and a cascade system. Also, the Chiyoda sensor is unable to provide an indication of the filter/dryer of the liquid line being partially stopped up. In this latter instance the system is unable to function properly, but the Chiyoda device unfortunately would fail to show a shortage of refrigerant.

For a system with a vertical rise from condenser to evaporator, it is possible for the liquid refrigerant to partially vaporize before getting to the throttling device. However, the Chiyoda sensor, limited to use in the receiver, would not sense this situation.

It was to overcome the severe disadvantages of these prior art devices that the present invention was evolved.

SUMMARY OF THE INVENTION

A primary object of my invention is to provide a relatively inexpensive and easily installed device for use in a refrigeration system that will positively prevent damage to the compressor resulting from an insufficient amount of refrigerant circulating through the system.

Another object of my invention is to provide a novel, stand alone sensor, enabling a highly effective and dependable alarm system to be furnished for a refrigeration system, which sensor is not limited to use in the receiver of the system, and which will promptly call attention to a condition involving an insufficient refrigerant level in this system.

Yet another object of my invention is to provide a low cost, highly effective sensor disposed upstream of the throttling device used in a refrigeration system, which sensor will immediately respond to an insufficient refrigerant level in the system, causing the sounding of an alarm, and at the option of the user, bringing about the insertion of additional refrigerant into the system, thus to cure the insufficiency.

Yet still another object of my invention is to provide a sensor arrangement utilized to establish the rate at which refrigerant is being lost, so as to provide the user with information as to the seriousness of a refrigerant leakage problem.

Yet another object of my invention is to provide a low cost alarm and automatic recharging device that will prevent damage to a refrigeration system, and also prevent "short cycling" of the compressor as a result of an insufficient level of refrigerant in the system.

Yet still another object of my invention is to provide a highly effective yet low cost alarm device that can be incorporated either into a new refrigeration system at the factory, or else readily installed in a retrofit manner to an existing system.

These and other objects, features, and advantages of my invention will be more apparent as the description proceeds.

In accordance with the present invention, a sensor is provided for sensing loss of refrigerant in a closed-loop refrigeration system which uses includes a throttling device, an evaporator for absorbing heat into the refrigerant, a compressor for compressing the refrigerant, a condenser for releasing heat from the refrigerant and a liquified refrigerant circulating portion for circulating the liquified refrigerant from the condenser to the throttling device. My sensor includes a generally vertically disposed reservoir having an upper portion and a lower portion. The reservoir is coupled in fluid communication with the compressed refrigerant recirculating portion of the refrigeration system. The sensor may further include upper and lower detectors disposed adjacent the ends of the reservoir, and one or more spheres or balls sufficiently buoyant to float in liquid refrigerant. One detector is positioned to detect the presence of the sphere or float when the amount of refrigerant in the system is below a predetermined level. A control means is operatively coupled to the detector for activating (or deactivating) a machine function when the detector detects the presence of the float. The other detector is typically used to indicate when sufficient refrigerant has been added.

In systems using non-conductive refrigerants, each detector function may utilize a pair of spaced electrodes. In systems using a conductive refrigerant, a pair of optical detectors can be used to detect the presence of the float. Preferably, the walls of the sensor reservoirs are constructed of a transparent material, such as glass, to enable the user to visually check the level of refrigerant.

Illustratively, the control means can comprise a signal means for producing a signal when the float becomes either electrically or optically detected by the detector. Alternatively, the control means can comprise a refrigeration system recharging means operatively connected to the detector and means for introducing additional refrigerant into the system when the detector detects the loss of refrigerant.

One important aspect of the present invention is that my novel sensor is coupled to the system by a T-connector. The typical sight glass in-line connection of the prior art permitted refrigerant to enter one end of the sight glass and out the other end. The present invention, however, permits entry of liquid refrigerant at the bottom of the sensor reservoir, and does not require a flow through. This feature enables the refrigerant to collect in the reservoir free of bubbles that would normally be formed by the temperature vaporization of the liquid refrigerant in a fully charged refrigeration system, and which typically occurs with in-line indicators. Furthermore, the reservoir serves as a liquid sump for drainage of liquid as the refrigerant level deceases.

One significant feature of the instant invention is that my novel sensor is adaptable for effective use in refrigeration systems that are designed with a wide variety of throttling devices, such as thermostatic expansion valves, automatic expansion valves, capillary tubes, low-side floats, high-side floats, or any other impedance device between the high side and the low side of the refrigeration system. The instant device will also register the level of the liquid refrigerant irrespective of the distances between the condenser (condenser and receiver) outlet and the inlet of the throttling device. The device will perform regardless of the length of the lines or the height of the evaporator.

My device can also be adapted for a wide variety of uses. For example, the sensor may be added to window or portable air conditioning units, and to air conditioners on motor-driven vehicles or aircrafts. One use of the instant device is with the refrigerated cases used in supermarkets or groceries. A malfunction of a refrigeration system in a grocery store can result in the loss or spoiling of the chilled or frozen products. This problem is especially acute with ice cream and other frozen goods which can become damaged upon thawing and refreezing.

The sensor of the present invention may also be used on heat pumps or reverse cycle refrigeration systems to alert the owner or his personnel that the system is losing refrigerant. Further, this device may be used on the high stage, low stage, or intermediate stage of an ultra low temperature cascade refrigeration system. At facilities using cascade refrigeration systems, it is especially important to be alerted in advance of a possible malfunction, since multiple refrigeration units are affected. In the medical research field, including blood banks which use these cascade types of refrigeration systems, the instant invention is capable of giving advance warning of a possible malfunction. Early detection of a malfunction could preserve blood from spoiling or prevent a culture growth from being destroyed.

In one embodiment of the instant invention, the sensor can be operatively coupled to either an alarm for indicating refrigerant loss, whereas another embodiment enables rate of refrigerant loss to be established. Still another embodiment enables automatic recharge of the refrigeration system.

Various other features and advantages of the instant invention will become apparent to those skilled in the art upon consideration of the following detailed description of several embodiments of my invention.

BRIEF DESCRIPTION OF DRAWINGS

FIG. 17 is a schematic diagram of a reverse cycle heat pump showing refrigerant flow during summer and during winter with changes in an indicated throttling and sensor configuration; and FIGS. 18A through 18G show details of various throttling and sensor configurations that may be utilized in the indicated block of FIG. 17, connected in accordance with the several identified points of the system thereof.

DETAILED DESCRIPTION

Figure 1:
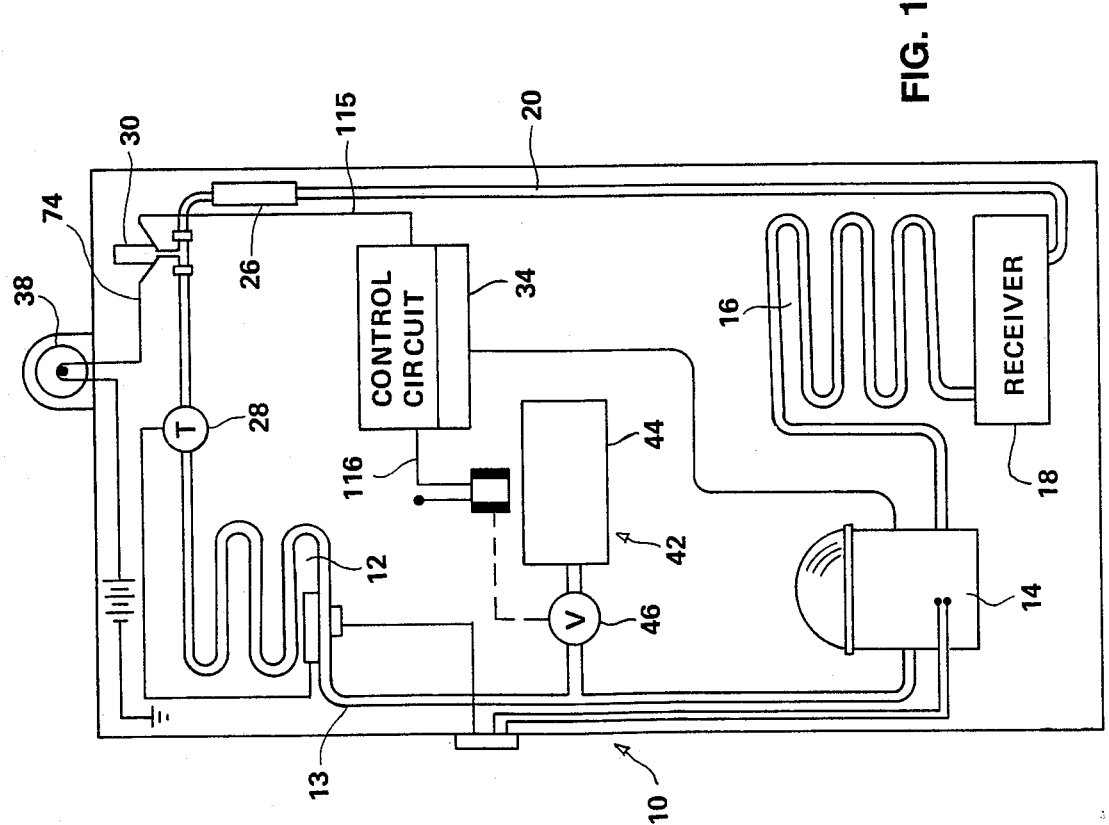
FIG. 1 is a diagrammatic view of a refrigeration system of the type in which a device embodying the present invention may be utilized.

A closed-loop refrigeration system 10 including a device embodying the present invention is shown in FIG. 1. Beginning the description of the refrigeration system with the evaporator (refrigeration coils), the evaporator 12 generally comprises a bank of pipe disposed in the space to be cooled, such as the inside of a walk-in freezer, the interior of a refrigerator, or the evaporator of an air conditioner. In the evaporator 12 is a refrigerant which has a boiling temperature that is lower than the temperature of the space to be cooled, so that heat is transferred from the space to be cooled, through the evaporator 12 to the refrigerant. The refrigerant absorbs heat as heat of evaporation, changing from a liquid phase to a vapor phase. Some examples of refrigerants include freon, ammonia, carbon dioxide, and sulfur dioxide.

The vaporized refrigerant is withdrawn from the evaporator 12 through refrigerant line 13 by a motor-driven compressor 14. The compressor 14 increases the pressure of the vaporized refrigerant until, at its discharge pressure, the refrigerant has a saturation temperature high enough so that it may be condensed by some available condensing medium, such as water or air.

The compressed refrigerant vapor is discharged from the compressor 14 into a condenser 16. The condenser 16 is usually a bank of pipe through which a cooling medium such as water or air passes. The refrigerant's heat of vaporization is passed from the vaporized refrigerant to the condensing medium, condensing the vaporized refrigerant to a liquified refrigerant. The condensing medium is then either wasted or cooled and recirculated.

The liquified refrigerant is passed to a receiver 18 which serves as a receiving or holding tank for the liquified refrigerant. Significantly, I do not place my sensor in the receiver, as some have taught, for many refrigerant systems in use today do not utilize a receiver. Thereafter, the liquified refrigerant passes through a liquified (compressed) refrigerant circulating portion 20 of the system 10, through filter-dryer 26, past the location of sensor 30, and then through throttling device 28.

Throttling device 28 may, for example, be a thermostatic expansion valve, an automatic expansion valve, a capillary tube, a low side float, a high side float, or any impedance device between the high side and low side of the refrigeration system, and my sensor 30 resides immediately upstream of the throttling device. The condition of the refrigerant as it emerges from the throttling device 28 is that of a liquid, a very small portion of which has been flashed into vapor. The refrigerant is delivered from the throttling device 28 to the evaporator 12.

A sensor 30 in accordance with my invention is in fluid communication with the compressed refrigerant recirculating portion 20 of the system 10 for sensing loss of refrigerant in the system. The sensor 30 is designed for refrigeration systems 10 which will operate from 125 psig to 400 psig. A control means such as control logic circuit 34 is operatively coupled to the sensor 30 for controlling activation and deactivation of one or more machine functions when the sensor 30 detects a low or insufficient level of refrigerant in the refrigeration system 10. One function performed by control logic circuit 34 when sensor 30 senses a low level of refrigerant is to activate a signal means such as signal light 38. The signal means 38 can include means (not shown) for keeping the signal 38 in an activated state until the signal 38 is manually deactivated. In systems without control logic circuit 34, sensor 30 can directly serve as the control means for performing the function of activating a signal 38. It is usually desirable to utilize a time delay means to prevent activation of an alarm means or a machine function during startup, when the level of the freon in the sensor is expectedly low.

Illustratively, the control logic circuit 34 is also operatively coupled to an automatic recharge system 42. Automatic recharge system 42 includes a storage tank 44 and solenoid valve 46. Automatic recharge system 42 is used for adding additional refrigerant into the refrigeration system 10 when the refrigerant level is low. Control logic circuit 34 operates solenoid valve 46 to selectively release refrigerant from storage tank 44 into the low side refrigerant line 13, which is on the suction side of the compressor.

Figure 2:
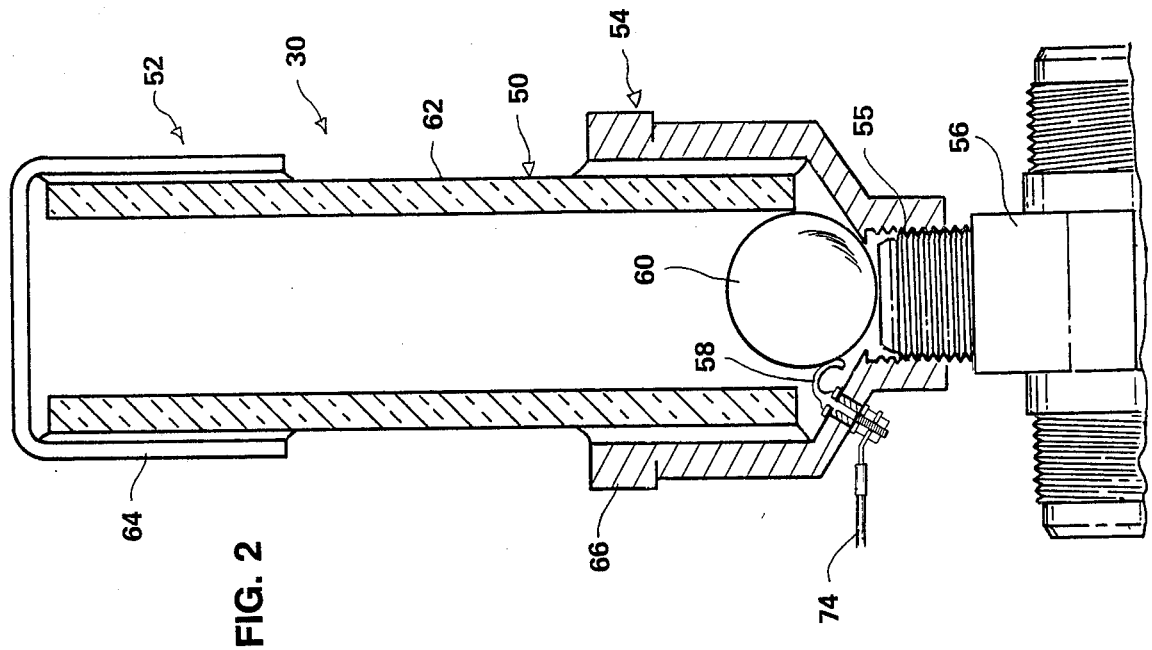
FIG. 2 is a cross-sectional view of a first embodiment of a sensor in accordance with the present invention, in which a floating, conductive sphere is utilized with a single lower electrode in order that a low refrigerant condition may be ascertained from a remote location.

One embodiment 30 of my sensor is utilized in FIG. 2, which may be seen to comprise a generally vertically disposed reservoir 50 containing a floating, conductive sphere 60. The reservoir 50 has an upper portion 52 and a lower portion 54, this preferably being a transparent sleeve 62 involving for example a 3" length of pyrex glass, having a ⅝" inner diameter, and a ⅞" exterior diameter. However, this and other of my sensors offering 360 degrees of viewing are merely illustrative and not limiting, and I may of course use sensors affording the operator only a small aperture through which the sphere may be viewed.

The transparent sleeve 62 is supported by a metallic lower housing member 66, and its upper end is enclosed, such as by a ⅞" copper cap 64. I prefer to secure the pyrex glass in the lower housing member 66 by the use of a two part epoxy, such as made by Sealed Unit Parts Company, and I seal the copper cap 64 on the upper end of the pyrex sleeve using the same procedure. Tests conducted to establish the suitability of this epoxy for securing the components together determined that a sensor constructed in this manner would withstand pressures over 1840 psig, which is far higher than pressures encountered in a refrigeration system.

Quite obviously I am not to be limited to the use of pyrex sleeves, for other suitable transparent or translucent materials could be used in certain instances should such be desirable.

The lower housing member 66 in this instance has an internally threaded lower end, such that it may be mounted on a T-type connector 56 that is used for connecting the reservoir 50 in fluid communication with the compressed refrigerant that is caused to circulate through the closed loop refrigeration system 10 by the use of compressor 14.

This particular sensor embodiment is seen to involve a single contact or electrode 58 mounted in the interior of the lower housing member of the sensor in an insulated relationship.

In this embodiment, the use of a second electrode or contact is made unnecessary, due to the configuring of the interior of the lower housing portion 66 such that the metallic sphere or ball 60 can simultaneously be touching the interior of the metal housing member 66 as well as the single electrode 58 when the liquified refrigerant has dropped to a certain level. In this instance, the lower housing member 66 serves as the ground for the circuit, or in other words, the circuit back to the current supply is made possible through the metallic contact the lower housing 66 has with the system ground.

As will be readily understood, the addition of refrigerant such as freon to the system causes the relatively light sphere 60 to rise in the sight glass, so that a passerby or the operator can readily see that a sufficient amount of refrigerant is in the system at a given moment. However, typically it would be inconvenient to have the operator constantly watching the sensor, so by the use of the electrode or contact 58 of FIG. 2, it is possible to create an electrical circuit that will provide proper notification to the operator, such as by an audible signal or a source of illumination, of a situation involving a low refrigerant level, warranting the operator's prompt attention.

The embodiment of FIG. 2 is not limited to any particular utilization, but due to its rugged construction and simplicity, it is ideal for use in automotive installations, wherein the electrical alarm circuit can operate on 12 volts.

The sphere I prefer to utilize in the embodiment of FIG. 2 is a hollow aluminum sphere made by Ultraspherics Incorporated of Sault Ste. Marie, Mich. This sphere is ½" in diameter, and weighs approximately 0.001585 pounds, quite light enough to float on freon and other refrigerants.

Figure 2A:
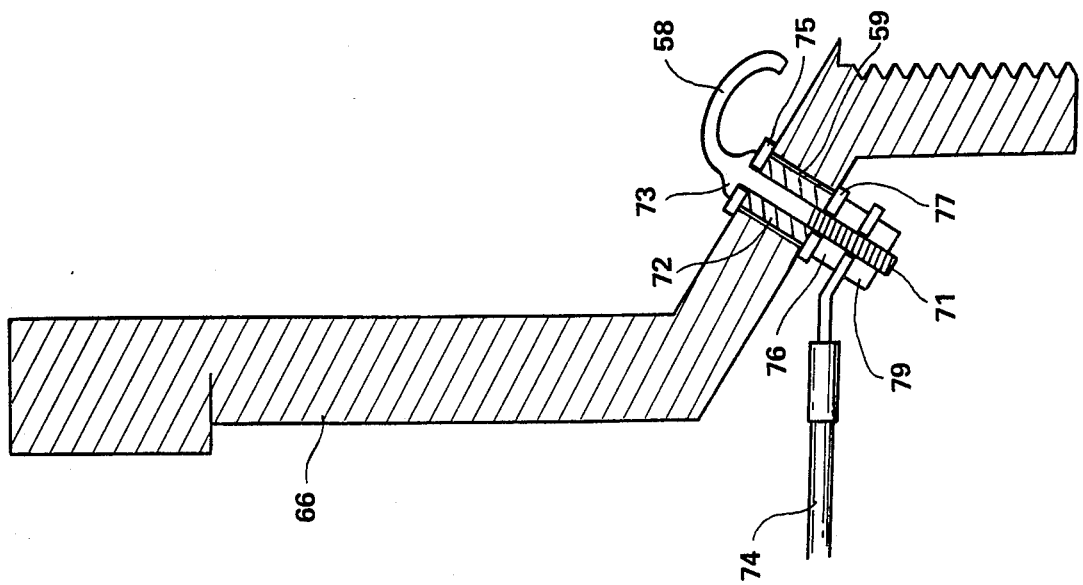
FIG. 2a is a fragmentary view to a substantially enlarged scale, of the significant details of the terminal arrangement utilized in FIG. 2.

In FIG. 2a, I have shown to a larger scale, the manner in which the components of the lower portion of FIG. 2 are assembled. The mounting of the electrode 58 is typically accomplished by providing a hole 59 through the lower housing member 66, with the threaded lower portion 71 of the electrode that passes through the lower housing member being surrounded by a short piece of teflon tubing 72 to prevent grounding of the electrode to the lower housing member 66. A shoulder portion 73 on the electrode 58 resides in the interior of the housing member, with a washer 75, such as a phenolic washer, utilized between the shoulder and the housing wall so as to provide electrical isolation as well as serving to prevent loss of refrigerant. A nut 76 is threaded on the lower end 71 of the terminal member, with a phenolic washer 77 serving the purposes of electrical isolation and leakage prevention.

I typically utilize some two part epoxy during the assembly of the teflon sleeve and other components onto the threaded lower portion 71 of the electrode, so as the nut 76 is tightened, the washers 75 and 77 are drawn tightly against the inner and outer ends of the hole 59 that extends through the housing. During the nut tightening procedure, some of the excess epoxy is extruded outwardly, and is wiped away.

After the nut 76 has been properly tightened, an electrical lead 74 associated with an alarm device is attached to the terminal, and secured in place by a second nut 79.

Figure 3:
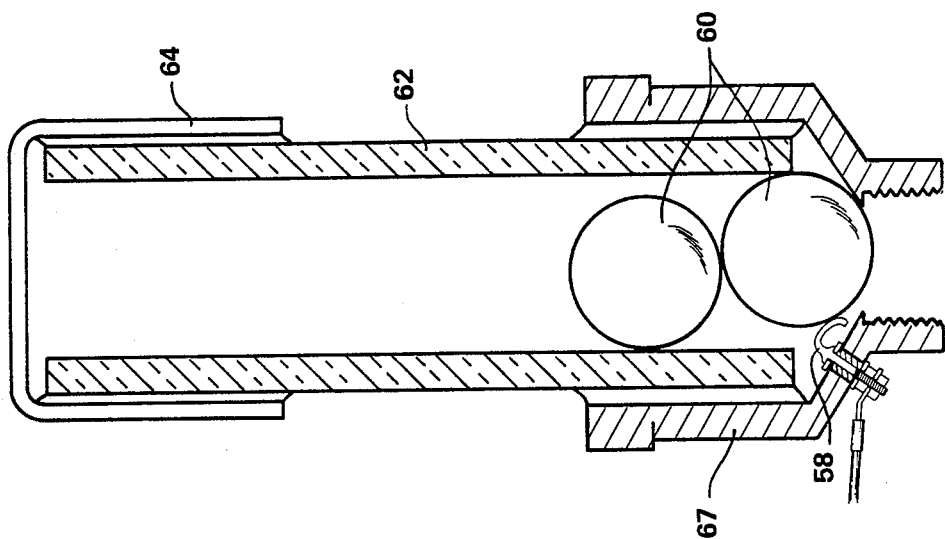
FIG. 3 is a cross-sectional view of an embodiment similar to FIG. 2, but in this instance also utilizing a second conductive sphere in order to provide a desirable amount of contact pressure.

With reference to FIG. 3, it will be noted to be a single electrode embodiment similar to the configuration of FIG. 2, but in this instance, two spheres 60 are utilized in order to force the lower sphere into firmer contact with the electrode 58 when the refrigerant has dropped to a low level. The electrode 58 is of course mounted in an electrically isolated manner in the lower housing member 67. This arrangement is preferable to the use of a single, heavier sphere utilized to make contact with the electrode, for not only would such be more expensive than the use of the light, readily available spheres I prefer to use, but also a single sphere heavy enough to assure good contact may not have satisfactory float characteristics.

As in the embodiment of FIG. 2, a portion of the lower housing member 67 forms the second contact for the embodiment of FIG. 3, such that the circuit causing the audible or visible signal to be sent is closed at the time the lower sphere is touching both the electrode 58 and the interior of the lower housing member 67. A top cap 64 is secured very tightly to the upper end of the transparent sidewall by the previously mentioned two part epoxy.

Figure 4:
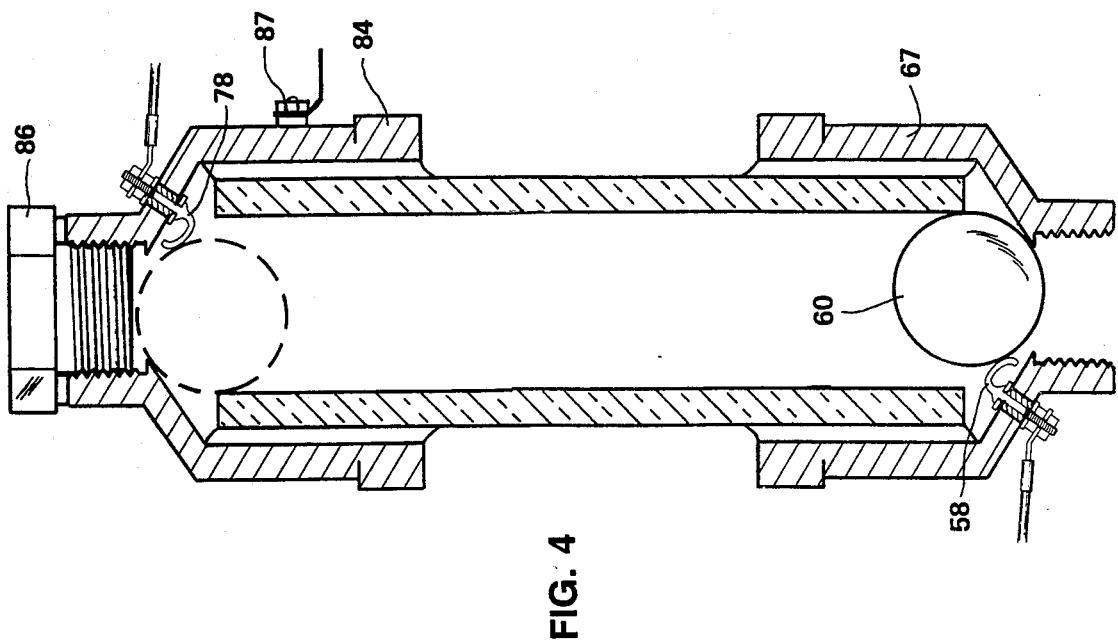
FIG. 4 is a cross-sectional view of an embodiment of this invention in which single electrodes are used in top and bottom interior portions of a sensor, with each of which a single conductive sphere may from time to time interact.

FIG. 4 is an additional embodiment related to FIG. 2, but FIG. 4 differs by utilizing a single electrode 78 located in the top interior of the reservoir, in addition to the single electrode 58 used as the detection means adjacent the lower portion of the reservoir. Whether the sphere 60 is in the lower position illustrated in full lines at the bottom of FIG. 4, or has floated to the top, as represented by dashed lines, one circuit is completed at the time the conductive sphere 60 is simultaneously in contact with the lower electrode 58 and the interior of the lower housing, and another circuit is completed when the sphere is simultaneously in contact with the upper electrode 78 and the interior of the upper housing member 84. The upper housing member may be substantially identical to the lower housing member, and tight closure of the threaded aperture is provided by a tapped plug 86 that serves a sealing function.

As an example, useful information can be provided both during the filling of the refrigeration system with refrigerant, as well as during the operation thereof. Typically, refrigerant is added to the system until the refrigerant reaches a certain predetermined level—one in which the conductive sphere touches the upper electrode and upper housing member to close the upper circuit. Then, the filling procedure can be terminated, and the system run, usually for a protracted length of time, until the refrigerant level becomes so low that the sphere makes simultaneous contact with the lower electrode 58 and the interior of the metallic housing member 67.

A preferred arrangement of my invention involves the lower electrode or electrodes being a part of a circuit that, when completed, brings about the automatic addition of refrigerant to the system in controlled amounts, which may be accomplished in a manner within the scope of the teaching of FIG. 2. Preferably, refrigerant is added only during the time the conductive sphere is in actual contact with the electrode(s), with cessation of the refrigerant flow occurring upon the sphere floating upward, out of contact with the electrode(s). As is obvious, a second sphere may also be used in this, or in other embodiments of this invention if such be desired, such as for reasons of a needed increase in contact pressure.

Inasmuch as the glass or plastic sensor sidewall is non-conductive, I find it necessary to ground the upper housing member 84 so that the circuit associated with the upper electrode 78 can be completed at such time as the conductive sphere simultaneously touches the electrode and the interior of the metallic member 84. The grounding terminal 87 is typically connected by an electrical lead to the system ground.

Figure 5:
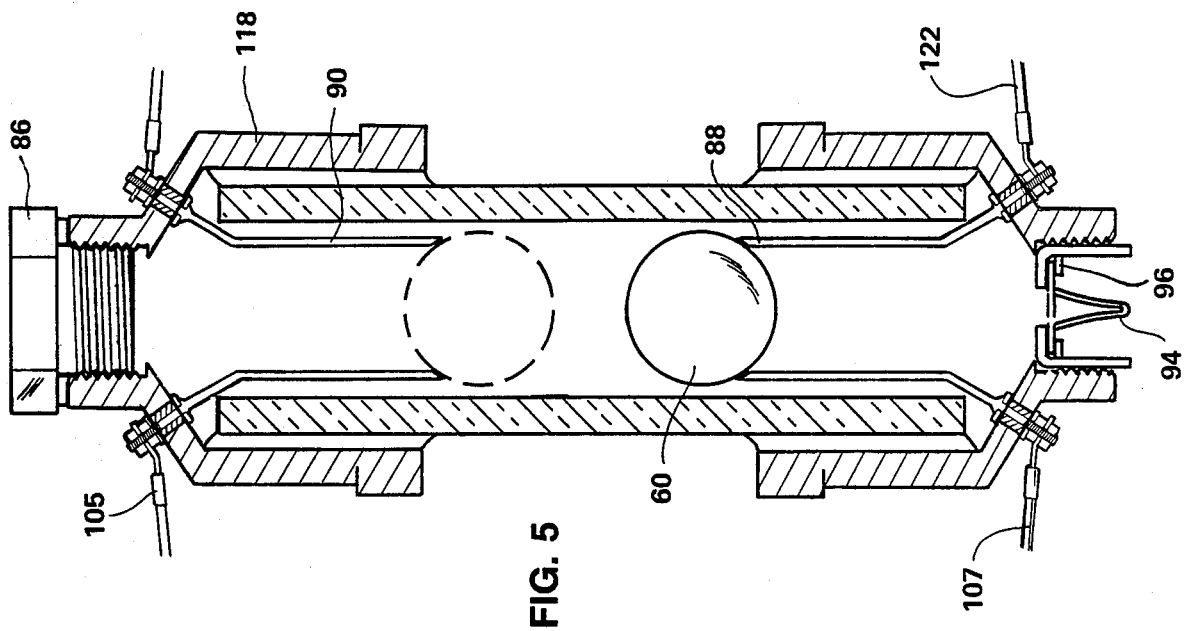
FIG. 5 is a cross-sectional view of an embodiment of this invention in which upper and lower spaced pairs of electrodes are utilized in a sensor, with a single floating sphere being able to interact with each pair, with this view also showing one arrangement used in the attaching of the sensor to an existing refrigeration system.

Turning to FIG. 5, it will there be seen that I have provided a sensor generally similar to the embodiments of FIGS. 2 through 4, except that a pair of spaced electrodes 88 is mounted in the lower housing portion, and a pair of spaced electrodes 90 is mounted in the upper housing portion, with leads 105 connected to the terminals of the upper electrodes serving to enable selected control functions to be accomplished. Preferably, the end portions of both of these pairs of electrodes that are arranged to be in contact with the conductive sphere are beveled so as to present as much surface contact area as reasonably possible, thus to assure a good flow path for electric current therethrough.

It is apparent from the embodiment of FIG. 5 that both pairs of electrodes pass through their respective housing members in a sealed relationship, with attention being given to a design in which the electrodes are electrically isolated from the housing members. This isolation is assured by providing holes in the housing members that are large enough to accept short sleeves of teflon tubing therein, through which the threaded mounting members for the electrodes pass. Also used on each terminal support are pairs of phenolic washers, which press tightly against each side of the housing members when the respective nuts are tightened. The arrangement and relationship of components set forth and described in conjunction with FIG. 2a is preferred.

As will be obvious in the embodiments of both FIGS. 4 and 5, the sphere 60 in its lower position (shown in full lines) closes an electrical circuit at such time as the quantity of refrigerant upon which the sphere floats has diminished to the predetermined level at which the sphere can no longer float free of the electrode or electrodes. In this instance, the completion of the circuit by the sphere in the full line position shown in FIG. 5 can bring about actuation of a warning device summoning the operator, so that he will add more freon to the system, or it can even accomplish a shutdown of the refrigeration system.

At the time freon or other suitable refrigerant is being added, the sphere 60 will float free until it rises to such an extent as to reach a predetermined upper level—the level at which the circuit through the upper electrode or electrodes is closed. At that point, a suitable signal or alarm device can advise the operator to stop adding refrigerant.

Figure 6:
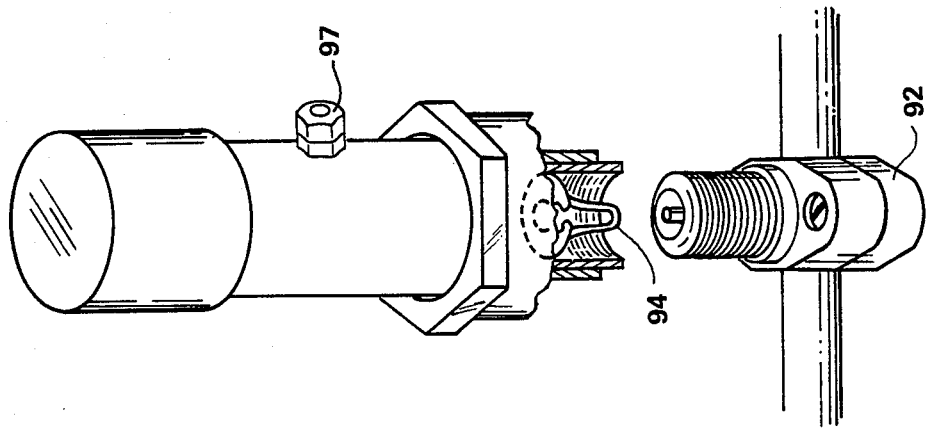
FIG. 6 is an exploded showing of a sensor having metallic sidewalls, with this view also revealing the use of certain components that simplify the mounting of a sensor to an existing system.

In FIGS. 5 and 6, I reveal a preferred arrangement for the installation of the lower housing member on a pressurized refrigeration system, accomplished without loss of refrigerant. After selecting the appropriate location in the system for the mounting of my sensor, the user applies an adjustable line tap valve 92, such as one made by Watsco, Inc. of Hialeah, Fla. This line tap valve, described as Part No. A-1, features a disappearing needle, and may be applied to the tubing immediately upstream of the throttling device by the use of only simple tools. The manufacturer states that this line tap valve is made under U.S. Pat. No. 3,428,075.

Visible in the bottom of the lower housing member in both FIGS. 5 and 6 is a metallic depressor device 94 placed so that when the sensor has been screwed firmly down on top of the line tap valve, the lowest portion of the depressor will act upon the upper interior portion of the line tap valve and cause an opening of same, such that the refrigerant from the system can flow up into the reservoir of the sensor. An O-ring 96 (FIG. 5) is ordinarily used to prevent leakage. Typically, this sensor arrangement will perform for many years in a highly satisfactory manner, but if for any reason the user wishes to remove the sensor, upon it being unscrewed from its mounting place atop the line tap valve, the inner valve of the line tap valve will close upon separation of the depressor 94 from contact therewith, such that the refrigerant system will remain in a desirably sealed condition.

With regard to FIG. 6, it is to be realized that I am not to be limited to a sensor equipped with transparent sidewalls, for as depicted here, the sensor sidewalls may be of metal, such as copper. Obviously, this arrangement does not permit the operator to view the position of the float or floats used in this embodiment, but when utilized with one or more of the electrical arrangements taught herein, the embodiment of FIG. 6 will provide highly satisfactory performance, such as in a location where physical damage might occur to the sensor, or where the sensor is located so as to be entirely unavailable for viewing by the operator. A terminal 97 passing in an insulated manner through the metallic sidewall enables a satisfactory electrical interconnection to be made to the interior electrode of the sensor device of FIG. 6.

Figure 7:
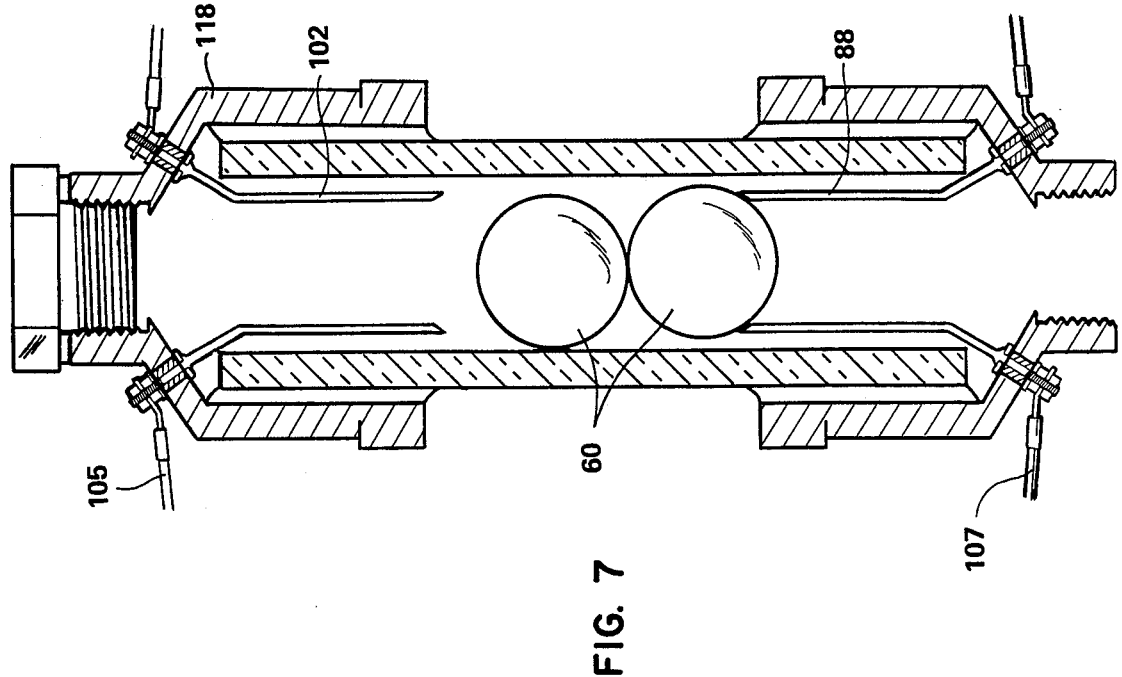
FIG. 7 is a cross-sectional view similar to FIG. 5, but revealing the use of a pair of floating, conductive spheres.

With reference to the embodiment of FIG. 7, it will here be noted that I have shown a pair of spheres usable with upper and lower pairs of spaced electrodes. When the spheres are in the full line position shown in FIG. 7, a desirable amount of pressure on the lower electrodes 88 serves to complete the circuit to a warning device, so that the operator will know to add more refrigerant. As mentioned before, the use of a pair of relatively light weight, hollow spheres is preferred over an arrangement in which a single, somewhat heavier sphere would be used in order to achieve a desirable amount of contact pressure at the time the system is running low of refrigerant. Upon the upper sphere floating into its predetermined upper position, contact will be made with the upper electrodes 102, closing the circuit serving to advise the operator to cease adding freon.

Figure 8:
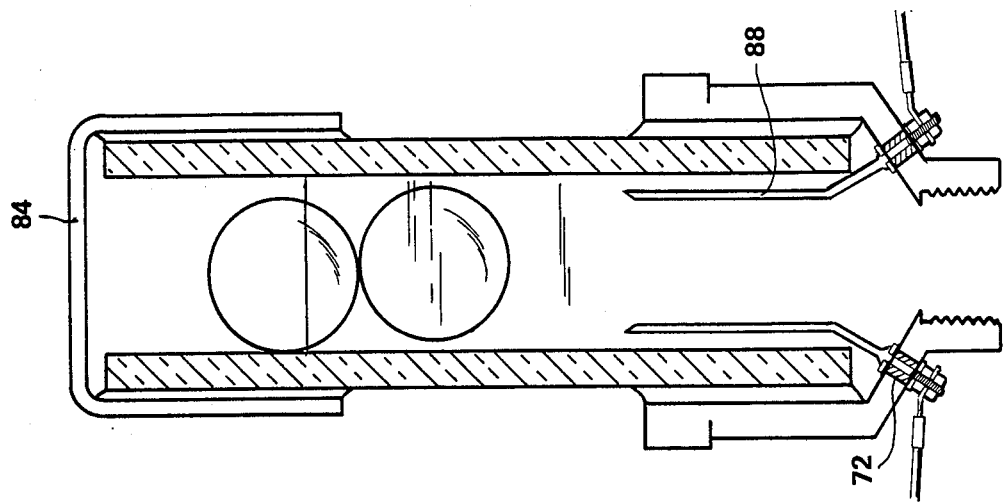
FIG. 8 is a cross-sectional view of a two sphere embodiment generally like FIG. 7, in which the spheres have floated out of contact with the lower electrodes, with this view differing from FIG. 7 by utilizing only a single pair of spaced electrodes, located in the bottom interior of the sensor.

In FIG. 8, I reveal an embodiment in which a pair of spheres is utilized in conjunction with a single lower pair of spaced electrodes 88. It is of course true that more vertical height is required in a sensor utilizing a pair of spheres, which may mean that the embodiments of FIGS. 7 and 8 are less suitable for automotive use, where a considerable amount of vertical height may be somewhat undesirable. In FIG. 8, the floating upwardly of the spheres as a result of entry of freon into the sensor breaks the circuit through the electrodes 88, such that the signal to add freon is no longer given.

Figure 9B:
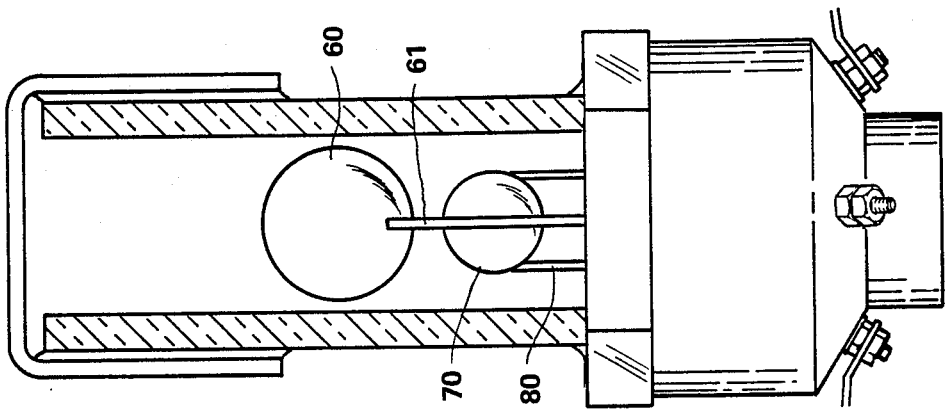
FIGS. 9a and 9b are two different views of an embodiment in which conductive spheres of two different diameters are advantageously utilized, with each sphere having a respective pair of appropriately spaced electrodes with which it interacts.
Figure 9A:
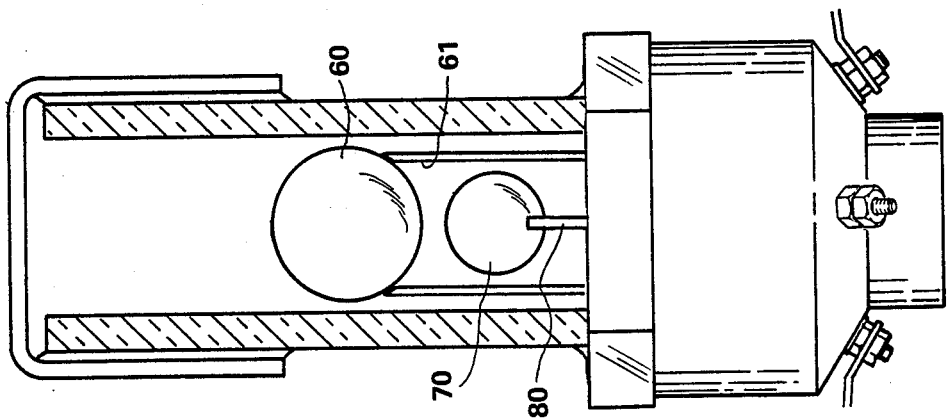

FIGS. 9a and 9b reveal a particularly advantageous embodiment of my invention, wherein a pair of conductive spheres of unequal size is utilized, and wherein a spaced pair of intermediate contacts or electrodes 61 are provided at a location just below the mid point of the sight glass of the sensor. These intermediate contacts 61 are spaced comparatively far apart, but not so far apart that the larger conductive sphere 60, typically ½″ in diameter, could pass between the contacts. This embodiment also utilizes a lower pair of contacts or electrodes 80, placed comparatively close together, and close to the lower housing member of the sensor.

Disposed below the large sphere 60 is a small sphere 70 of a size, such as ⅜″ in diameter, that will readily pass through the intermediate contacts 61 without closing the circuit thereof, but that will serve to close the circuit through the lower contacts 80 at such time as the refrigerant level has dropped considerably. The sphere 70 is not so small as to pass by the larger sphere, and rise to a position above it.

It is obvious that the embodiment of FIGS. 9a and 9b can be utilized as shown, but if desirable to increase contact pressure, I can use two smaller spheres inside the sensor that are below two larger spheres. As is obvious, the vertical spacing between the intermediate contacts and the lower contacts must be increased in such instance, for it is not desirable for the weight of a larger sphere to bear against a smaller sphere, for this may well result in a false reading.

As is obvious, one pair of terminals on the exterior of the lower housing member is associated with the intermediate contacts 61, whereas the other pair is associated with the lower contacts 80. It is also obvious that these separate pairs of terminals enable each pair of electrodes to become part of its own electrical circuit. A technique of the type described in conjunction with FIG. 2a is preferred in order to provide electrical isolation and freedom from leakage.

The embodiment of FIGS. 9a and 9b readily enables the rate of refrigerant loss to be calculated, for beginning at such time as the refrigerant level has dropped sufficiently as to permit the larger sphere to seat on its contacts or electrodes 61, the user can calculate from the hours or days needed for the smaller sphere to seat on its set of contacts 80, the loss rate.

Figure 10:
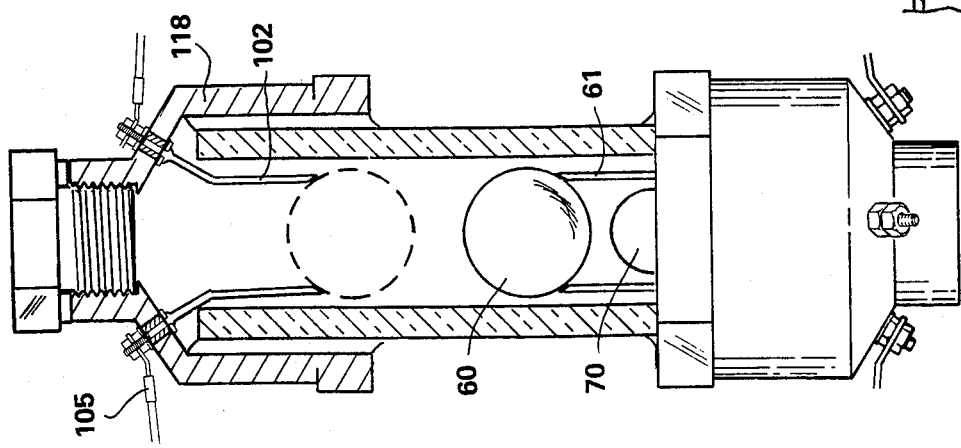
FIG. 10 is another embodiment utilizing a pair of differently sized floating spheres, this embodiment differing from the embodiment of FIGS. 9a and 9b by also utilizing an upper pair of spaced electrodes.

Still another embodiment of my invention can entail the use of top electrodes utilized in conjunction with the intermediate and lower contacts utilized with the large and small spheres. FIG. 10 is illustrative of such an arrangement, with the use of top electrodes 102 enabling the user to add refrigerant to the suction side of the compressor until such time as the uppermost sphere makes contact with the top electrodes, closing the circuit therebetween, and causing an appropriate signal to be sent. This latter circuit will be seen to involve leads 105.

The arrangement of FIG. 10 also enables the rate of loss of refrigerant to be calculated, for after the filling of the system, when the refrigerant level has dropped so low as to permit the larger sphere 60 to close the circuit through the intermediate set of contacts 61, the user can establish how many hours or weeks elapsed between the filling of the system, and the time the circuit through the intermediate contacts has been closed. Quite obviously the time required for the lower sphere 70 to thereafter seat on its contacts 80 could also enter into the calculations concerned with establishing the leakage rate.

Although I am not to be limited to same, it is within the practice of my invention with respect to this embodiment to have the condition in which the lower, smaller sphere 70 settles on its contacts to bring about closing of a circuit that will automatically shut down operation of the compressor 14, thus to prevent damage thereto.

Another alternative I may use involves the closing of the circuit through the intermediate electrodes or contacts 61 causing the illumination of an amber light, or bringing about some other warning type function. Then, upon the closing of the circuit through the lower electrodes or contacts 80 by the settling of the smaller sphere, a red light can be illuminated, or some other type of warning given.

Figure 11:
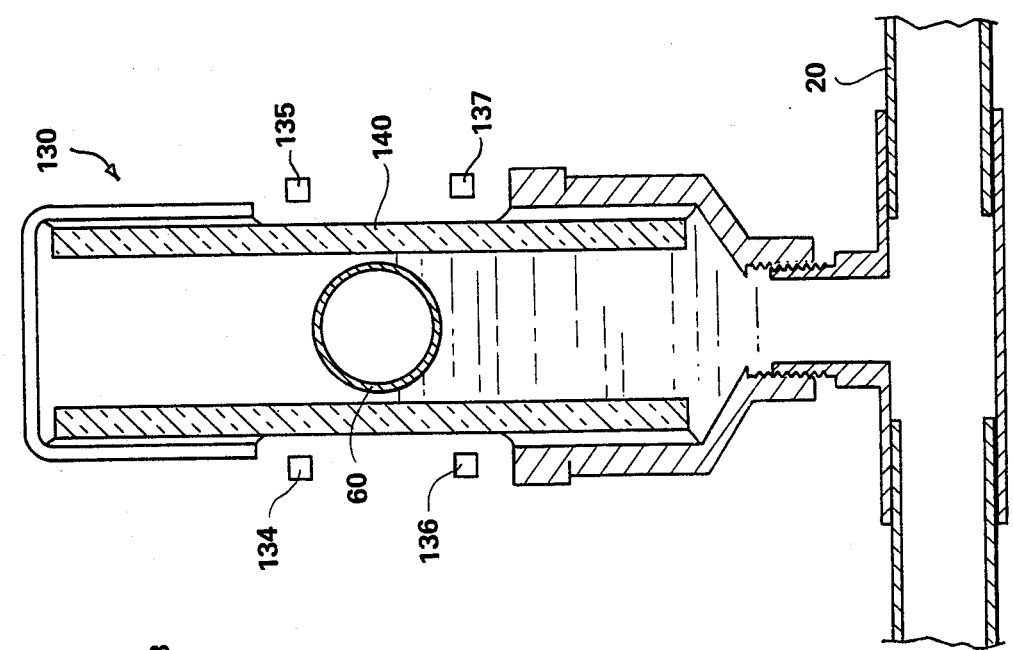
FIG. 11 is a cross-sectional view of an optical embodiment of the present invention.

In the illustrative embodiment shown in FIG. 11, sensor 130 is similar to the previously discussed sensors except that sensor 130 uses an optical detector illustratively shown as photodetectors 134, 135, 136, 137 in place of electrodes such as 58, 88, 90 and 102. Sensor 130 includes an upper photodetector 134, 135 which is shown illustratively as a light-emitting diode 134 and a phototransistor 135. Likewise, lower photodetector 136, 137 includes a light-emitting diode 136 and phototransistor 137. The LEDs 134, 136 and phototransistors 135, 137 detect the presence of the float ball 60 optically and are coupled to a control logic circuit, such as control logic circuit 106, shown in FIG. 13. The right cylindrical wall 140 of sensor 130 should be made of a transparent material such as glass or plastic which will enable the light emitted from the light-emitting diodes 134 and 136 to be received by phototransistors 135 & 137, respectively. The use of photodetectors 134, 135, 136, 137 is preferred in situations wherein an electrically conductive refrigerant is being used.

Figure 12:
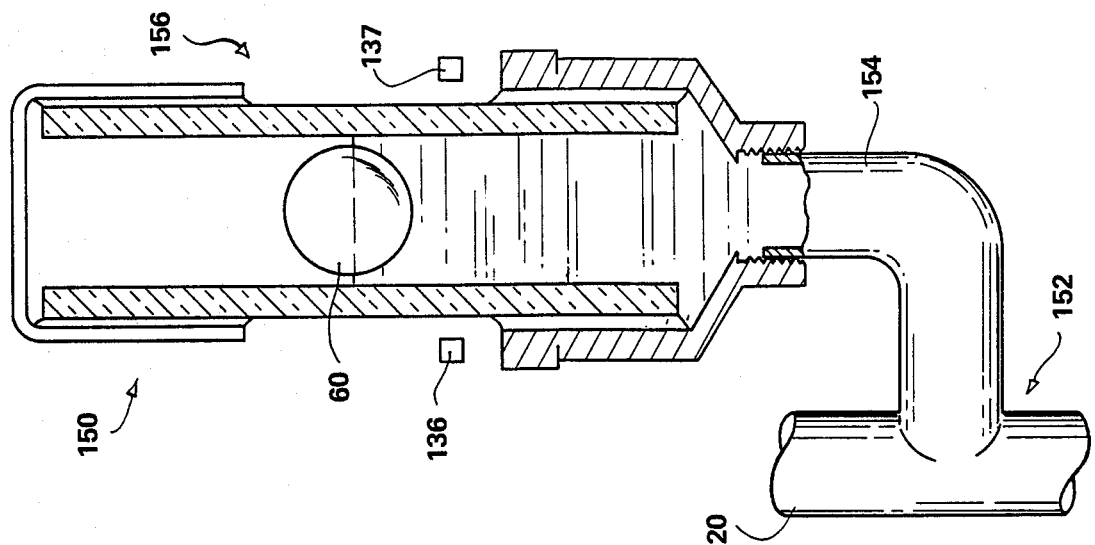
FIG. 12 is a cross-sectional view of another optical embodiment of the present invention, also showing a type of side mount.

Referring now to FIG. 12, a sensor 150 is shown having photodetectors 136, 137. Sensor 150 is joined to a vertically disposed portion of compressed refrigerant recirculation portion 20 by a T-connector 152 having an L-shaped leg 154. Through its arrangement, the sensor 150 can be used in the refrigeration system at a point wherein the compressed refrigerant recirculation portion 20 extends generally vertically. The L-shaped leg 154 of T-connector 152 maintains the reservoir 156 in a generally vertically disposed position.

Figure 13:
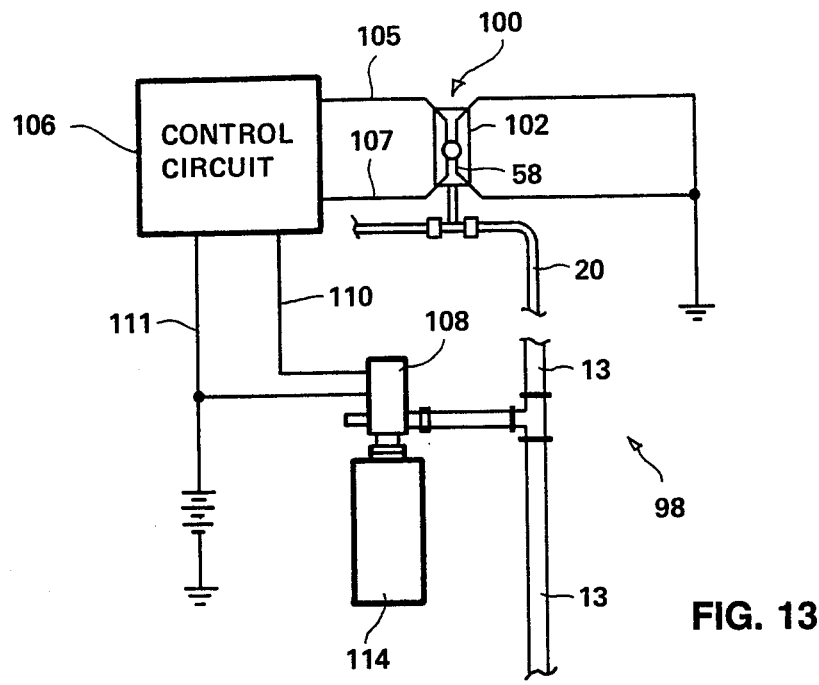
FIG. 13 is a diagrammatic view of an automatic recharging system for the present invention.

In FIG. 13, I reveal a refrigeration recharge system 98 wherein the sensor 100 utilizes two pairs of electrodes, as shown in certain earlier figures, such as FIG.

7 for example. The second pair of electrodes 102 are connected by a line 105 to a control logic circuit 106. The first or lower pair of electrodes 88 are connected by line 107 to a different portion of control logic circuit 106. Control logic circuit 106 is operatively connected to solenoid valve 108 by lines 110, 111. Control logic circuit 106 serves to actuate solenoid valve 108 in response to a signal from sensor 100 (when the lower sphere is seated) to allow refrigerant from refrigerant storage tank 114 to be introduced into refrigerant line 13 on the suction side of the compressor of FIG. 1.

When a sufficient quantity of refrigerant has been introduced into the system 98, the upper sphere floats into the preascertained upper position in which its closes the circuit involving the upper pair of electrodes, thus shutting off solenoid 108. Other machine functions may also be activated or deactivated when float 60 contacts electrodes 102.

As should now be apparent, it is possible by the use of a selected sensor in accordance with this invention to provide useful information both during the adding of freon to the refrigeration equipment, as well as during the running of the equipment.

The introduction of additional refrigerant into a system insufficiently charged with refrigerant will result in enough refrigerant to flow into reservoir 50 as to cause float 60 to become disconnected from lower electrodes, such as 58 or 88. When float 60 becomes disconnected from these lower electrodes, signal means 38 of FIG. 1 ceases to emit a signal.

As will be recalled, refrigerant is added to the suction side of the compressor 14 of FIG. 1 until such time as the ball or sphere 60 of FIGS. 3 through 5 (or the upper sphere if two are used) rises to the upper predetermined level at which it makes contact with the upper electrodes. At the time the circuit through the upper electrodes is closed by the metallic sphere, the refrigerant adding operation ceases.

As is obvious, after proper filling, the refrigeration equipment can be operated, with the compressor 14 of FIG. 1 pumping refrigerant through the condenser, the throttling means, the evaporator and the other components without risking the situation in which an insufficient amount of refrigerant is passing unnoticed through the throttling means. This statement is made in view of the fact that upon the quantity of refrigerant passing through the throttling means becoming insufficient for any of several reasons, the sphere 60 (or the lower sphere if two are used) will settle down upon the lower electrode or electrodes, thus completing a circuit therethrough, and originating a suitable warning means that will apprise the operator that the lower predetermined level has been reached, indicating a situation needing to be remedied.

As previously mentioned, by the use of upper and lower contacts, the rate at which refrigerant is being lost can be readily ascertained by the user, for if X number of hours or weeks are involved between the time of filling the system with refrigerant and the time the lower contacts are closed by the sphere settling thereon, the loss rate can be readily calculated.

In applications such as automobiles, signal means 38 (FIG. 1) may take the form of a dashboard light. In other applications, the signal means 38 can take the form of an alarm, light, computer, signal, or buzzer which is activated at a central location distant from the system 10 or at any other place where the user can detect the activation of the signal means 38.

Figure 14:
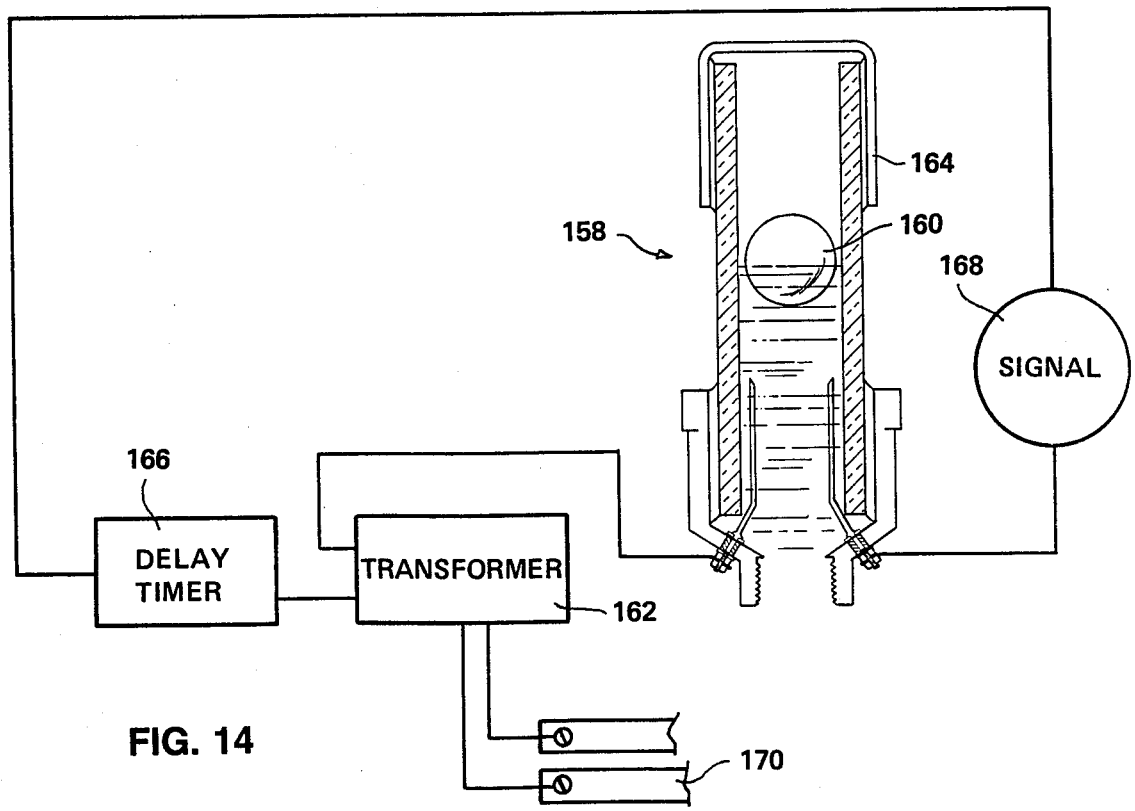
FIG. 14 is a simplified wiring diagram, showing how an alarm arrangement may be established for an existing system.

FIG. 14 shows a diagram of a sensor 158 having transparent cylindrical sidewalls capped by upper closure member 164, and a pair of lower electrodes with which conductive sphere 160 can interact. When the electrodes are bridged by the sphere due to a low refrigerant level being reached, a circuit through signal device 168 is closed such that a suitable alarm will be given. I prefer to utilize a delay timer 166, such that an unnecessary alarm will not be given during the period before the operational level for the freon has been reached. As an example, the delay timer can be a Mars solid state delay timer having a dial enabling a selected amount of delay to be set. I prefer to use a Model 32391 settable at one minute intervals between 6 seconds and 8 minutes.

Electrical power at the proper voltage level is provided by the use of transformer 162, which is connected to the load side of the compressor contactor 170. Therefore, when the compressor is started, the contactor closes and energizes the electrical circuit, such that an alarm will be given should the refrigerant level in the sensor 158 be too low by the time the time delay has expired.

Although in this embodiment only a single float or sphere 160 is depicted, I usually prefer in an embodiment of this type to use a pair of spheres, as herein earlier described.

Figure 15:
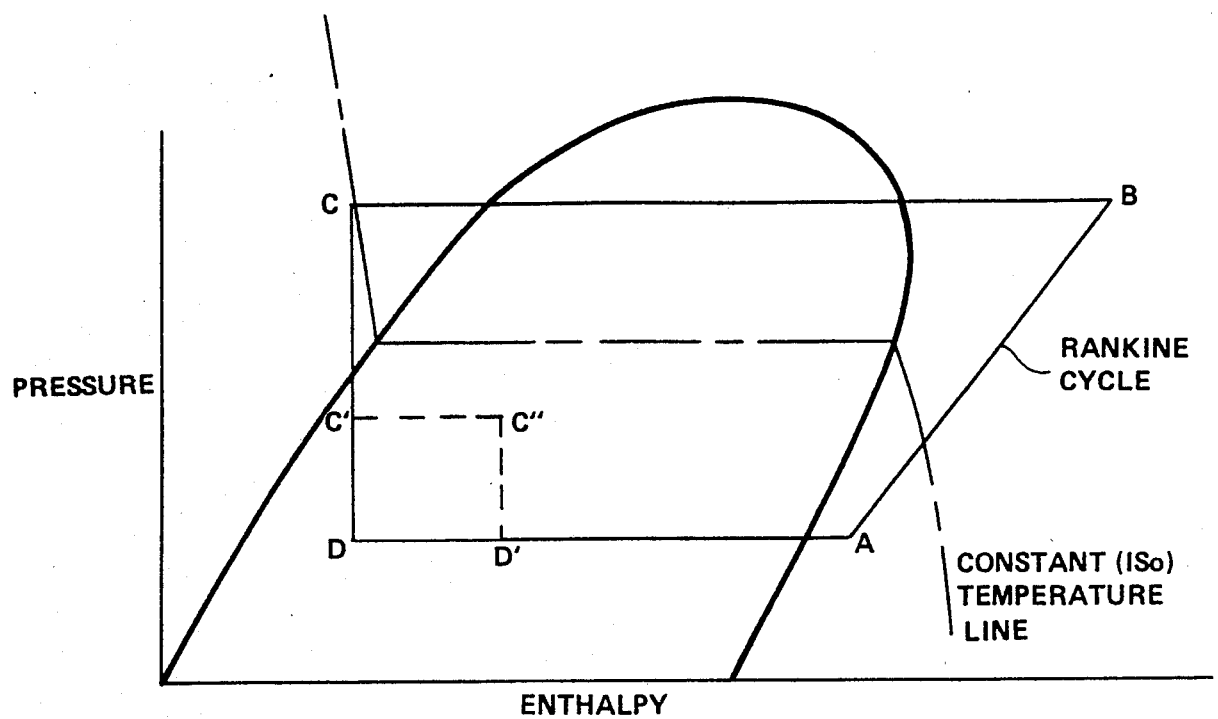
FIG. 15 is a graph showing the amount of subcooling attained in accordance with this invention, for a typical Rankine cycle.

With regard to FIG. 15, it is important to note that my novel device directly measures the subcooled state of a refrigerant. As noted above, the usual manner for doing this is by measuring other stated quantities, such as pressure and temperature, and then computing the amount of subcooling. My device, by measuring the height of a liquid in a vertical column, effects the determination of needed quantity, the amount of subcooling, without affecting the state of the operating system. Since a subcooled refrigerant guarantees that liquid (rather than a liquid-vapor mix) enters the throttling device, the measurement of this quantity determines whether a system is properly charged or not. It is to be noted that the common sight glass of the prior art does not measure the amount of subcooling, but rather indicates, by a lack of bubbles, if a refrigerant is at all subcooled. That is, it does not quantify the amount of subcooling. Also it is to be realized that a clear sight glass may indicate no refrigerant at all in system, rather than liquid being present. Thus, optical determination of the presence of bubbles is not a good measure of subcooling.

My advantageous design depends on the unique tee tap-off from the high pressure line (between condenser and throttling device), whether it is a vertical, horizontal, or slanted line. Thus, there is no restriction on the positioning of the line for which the subcooling is being measured.

FIG. 15 depicts a pressure-enthalpy chart for a typical refrigerant, and a Rankine cycle is drawn as the closed contour. The amount of subcooling (as measured by the pressure differential) is shown on this graph. Equivalently, the amount of subcooling is indicated by the temperature differential at constant pressure which is necessary to change the refrigerant to a saturated liquid. Since this temperature differential is equivalent to an enthalpy differential, and enthalpy differential represents a change in efficiency, my device directly measures a change in the efficiency of a refrigeration system due to refrigerant loss.

With continued reference to FIG. 15, a normally functioning system would result in the cycle from A to B to C to D and back to A again, where A represents the state of the refrigerant having left the evaporator and just entering the compressor. State B represents the condition of the refrigerant out of the compressor and entering the condenser. State C represents the refrigerant out of the condenser, and state D represents the refrigerant out of the throttling device.

Consider the altered state C' which would result if a filter/dryer became partially clogged, or the evaporator is located significantly above the condenser (say on the 2nd floor of a building), for this would cause a pressure drop represented by the distance C to C' on the p-h diagram. Further, because the temperature at this point is lower than the surrounding ambient, there will be a change in enthalpy (i.e. heat gain) denoted by the distance C' to C''. Then throttling will take place, with the refrigerant exiting the throttling device at state D' rather than state D. Thus, the amount of refrigerating effect (cooling capability) available has been reduced by the amount D to D'.

It is to be noted that my sensor will sense the fact that the system is not sufficiently charged with refrigerant, whereas a sensor placed in the receiver per the Chiyoda teaching would not sense this malfunction. Further, this sensor makes this information available through an electrical signal and does not require visual inspection as a sight glass would. Thus, there accrues the double advantage of first being able to place the sensor next to the throttling device, and second, being able to read the sensor remotely rather than requiring visual inspection.

My sensor, because it measures the amount of subcooling directly, thus determines whether the system is operating properly.

As should now be abundantly clear, in refrigeration systems having automatic recharge systems, such as that shown in FIG. 1, the engagement of the conductive float 60 with the electrode 58 (FIGS. 2 through 4) or the electrodes 88 (FIGS. 5, 7 and 8) closes the circuit through electrical line 115, sending a suitable signal to control logic circuit 34. Control logic circuit 34, which may include a suitable time delay, sends a signal through line 116 to open solenoid valve 46. In its open position, solenoid valve 46 allows refrigerant from storage tank 44 to be introduced into refrigerant line 13 to recharge the system. After a sufficient amount of refrigerant has been introduced into refrigerant line 13, control logic circuit 34 signals solenoid valve 46 to close to prevent overfilling with refrigerant. Generally, the predetermined amount of refrigerant will be determined by the length of time required to dislodge float 60 from electrode 58 or electrodes 88, and the time delay enabling logic system included in the circuit 34. When float 60 becomes disengaged from electrode 58 or electrodes 88, the circuit will be broken and the solenoid 46 will shut off after a suitable time delay to allow sufficient refrigerant to enter the system 10 so that the system will remain in the condition at which the float 60 is out of contact with the electrode 58 or electrodes 88.

During off periods and during the first part of the start-up of the refrigeration system 10, the logic circuit 34 is disabled or delayed, so that normal running conditions can be established. This disabling means, which may be in the nature of the device 166 mentioned in connection with FIG. 14, senses the energizing signal of the compressor 14, delays the signal for the appropriate amount of time, and then sends the signal by line 117 to the control logic circuit 34 which re-establishes normal operating functions.

Figure 16:
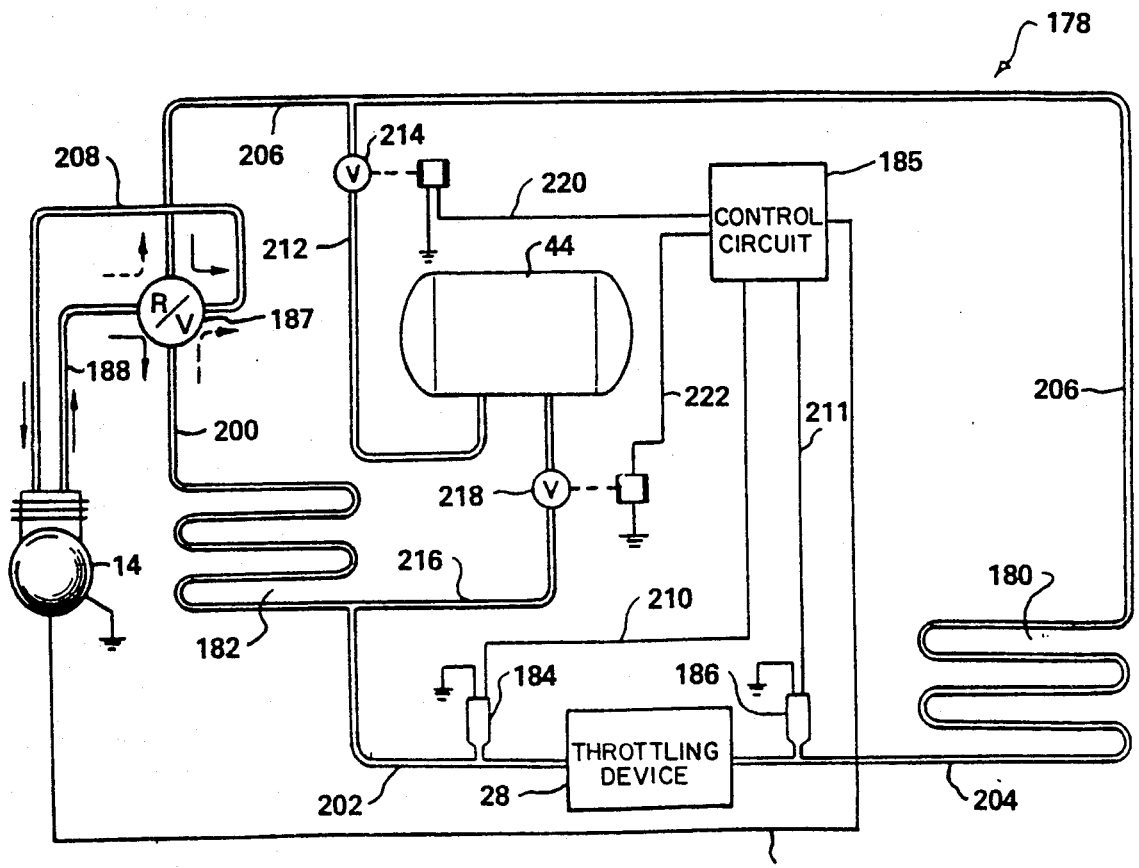
FIG. 16 is a diagrammatic view of a heat pump or reverse cycle refrigeration system using the present invention.

A heat pump system 178 with automatic charge modulation and recharge capability is shown in FIG. 16. Heat pump 178 includes a compressor 14, throttling device 28, and storage and supply tank 44 much like refrigeration systems 10 (FIG. 1) and 98 (FIG. 13). In place of a single function evaporator and condenser, heat pump system 178 includes an inside heat exchanger 180 and an outside heat exchanger 182. When heat pump system is in a cooling cycle, inside heat exchanger 180 serves as an evaporator and outside heat exchanger 182 serves as a condenser. When heat pump system 178 is in a heating cycle, inside heat exchanger 180 serves as a condenser and outside heat exchanger 182 serves as an evaporator. A pair of sensors 184, 186 similar or identical to sensors shown and described in the early figures of this case are placed in the heat pump system 178 on either side of throttling device 28. Heat pump system 178 also includes a reversing valve 187 which can reverse the flow of refrigerant in heat pump system 178.

During the cooling cycle of heat pump 178, coolant flows from compressor 14 into refrigerant line 188, through reversing valve 187 and into refrigerant line 200. The refrigerant flows from refrigerant line 200 through outside heat exchanger 182 which, in the cooling cycle, serves as a condenser to condense vaporized refrigerant into a liquid. From condenser 182, compressed refrigerant flows to throttling device 28. During the cooling cycle, refrigerant line 202 serves as the liquified refrigerant circulating portion. Sensor 184 is placed in the line 202 and, during the cooling cycles, senses the amount of refrigerant in the system 178. Sensor 184 performs this function in a manner similar to that described above and shown in the early figures of this case. Refrigerant flows out of throttling device 28 into refrigerant line 204 and into inside heat exchanger 180. During the cooling cycle, inside heat exchanger 180 serves as an evaporator, wherein the refrigerant absorbs heat from the room or area being cooled. Refrigerant flows from inside heat exchanger 180 into refrigerant line 206 into reversing valve 187. Refrigerant flows from reversing valve 187 into refrigerant line 208 and back into compressor 14.

During a heating cycle of the heat pump system 178, the flow of coolant in the system 178 is partially reversed. Refrigerant flows from compressor 14 into refrigerant line 188, through reversing valve 187, and into refrigerant line 206. Refrigerant flows from refrigerant line 206 into inside heat exchanger 180 which, during the heating cycle, serves as a condenser. Condensed refrigerant flows out of inside heat exchanger 180 into refrigerant line 204 and into throttling device 28. A second sensor 186 is placed in fluid communication with refrigerant line 204. During the heating cycle, refrigerant line 204 serves as the liquified refrigerant circulating portion. During the heating cycle, sensor 186 functions similarly to the sensors described and shown hereinbefore. Refrigerant flows through throttling device 28 into refrigerant line 202 and into outside heat exchanger 182 which, during the heating cycle, serves as an evaporator. Refrigerant flows out of outside heat exchanger 182 and into refrigerant line 200 through reversing valve 187, into refrigerant line 208, and ultimately into compressor 14. Sensors 184, 186 are in communication with control logic circuit 185 through lines 210, 211, respectively.

Storage tank 44 includes a line 212 which connects the storage tank 44 to refrigerant line 206 through a first solenoid valve 214, and a line 216 which connects the storage tank 44 to refrigerant line 202 through a second solenoid valve 218. First and second solenoid valves 214, 218 are in communication with control logic circuit 185 through communication lines 220, 222, respectively.

During the cooling cycle, sensor 184 determines if there is sufficient charge of refrigerant. If there is insufficient refrigerant, the detecting means (not shown) in sensor 184 signals the control logic circuit 185 to introduce liquified refrigerant from storage tanks 44 into the system 178. To introduce liquified refrigerant into the system, control logic circuit 185 actuates solenoid valve 214 through communication line 220 to open the solenoid valve 214, allowing refrigerant from storage supply tank 44 to flow through solenoid valve 214 into refrigeration line 206. In a manner similar to refrigerant systems 10 (FIG. 1) and 98 (FIG. 13), refrigerant is introduced into the low side of the refrigeration system 178 to increase the charge on the low side of the system 178. Concurrently with the opening of solenoid valve 214 to increase the charge on the low side of the system, solenoid valve 218 is opened to reduce the charge on the high side of the system.

During the heating cycle, sensor 186 determines if there is sufficient refrigerant in the system 178. Valve 218 is opened to allow refrigerant from storage and supply tank 44 to flow into refrigerant line 202 which, during the heating cycle, is on the low side of the heat exchange system 178. Concurrently, valve 214 is opened to reduce the charge on the high side of the system. In this manner, the optimum refrigerant charge is maintained during both the cooling and heating cycles.

Turning to FIG. 17, it will there be seen that I have provided a symbolic diagram of a heat pump or reverse cycle arrangement, with the reversing valve being movable so as to bring about the refrigerant flowing through the system in one direction during summer, as represented by a curved arrow on the left, and a flow of refrigerant through the system in the opposite direction during the winter, as represented by the curved arrow on the right.

The Throttling and Sensor Configuration block is shown connected to the other components of the heat pump at locations a, b and c, with it being understood that the fragmentary configuration therebelow, identified in FIGS. 18A through 18G, represent various arrangements of throttling means that may be connected to locations a, b and c in order that my sensors may be utilized in the heat pump system.

More specifically, configuration 18A reveals a capillary tube arrangement, on the left side of which is the summer sensor, and on the right side of which is the winter sensor. Quite obviously, this arrangement is usable in either the heating mode or the cooling mode of the system.

A somewhat different arrangement of components is utilized in configuration 18B directly below, for here a pair of capillary tube arrangements are utilized between the pair of sensors, with a check valve being utilized in connection with one of the capillary tubes.

In configuration 18C I utilize an expansion valve in parallel with the capillary tube, with flow through the expansion valve being permissible from right to left in this embodiment. It should further be noted that a connection from point c is made to the corresponding point in the principal FIG. 17 diagram above, namely, to the sensing bulb.

In configuration 18D I reveal the use of the capillary tube in parallel with an expansion valve permitting flow from left to right, with the capillary tube utilized in the heating mode, and the expansion valve used in the cooling mode.

In configuration 18E I reveal a pair of expansion valves in a parallel arrangement, with the upper expansion valve being connected to point c or d in the principal diagram in FIG. 17 and the lower expansion valve being connected to point c or e.

In configuration 18F I utilize an expansion valve with check valves and receiver, with the same sensor being utilized for both summer and winter.

Lastly, in configuration 18G, I utilize a somewhat different arrangement of expansion valve with check valves.

It is to be understood that depending on the circumstances, the reverse cycle system of the type illustrated in FIG. 17 may be utilize an appropriate configuration of sensor(s) and throttling means.

The embodiments of my invention set forth herein are merely exemplary, and I am not to be limited to these teachings and descriptions except as required by the scope of the appended claims.

I claim:

1. In a refrigeration system having a condenser connected by a liquid refrigerant line to a throttling device, an alarm and control sensor comprising:
   a closed chamber having a vertical orientation, said chamber having a refrigerant inlet connection at a lower portion thereof, said connection in fluid communication with said liquid refrigerant line adjacent to said throttling device such that liquid refrigerant in said line enters said chamber;
   an electrically conductive float enclosed in said chamber;
   a first pair of electrical contacts disposed within said lower portion of said chamber and having external connections thereto, said contacts positioned to be closed by said conductive float when the level of liquid refrigerant in said chamber is at or below a preselected low level and to be open when the level of liquid refrigerant in said chamber is above said low level; and
   a second pair of electrical contacts disposed within an upper portion of said chamber and having external connections thereto, said contacts positioned to be closed by said conductive float when the level of said liquid refrigerant in said chamber is at or above a preselected high level and to be open when the level of refrigeration said chamber is below said high level.

2. A sensor for sensing the quantity of refrigerant in a closed loop refrigeration system comprising:
   attachment means on a lower portion of said sensor for installing said sensor in direct communication with the refrigerant line of the refrigeration system upstream of a throttling device of the system;
   a hollow interior portion of said sensor defined by generally cylindrical sidewalls;
   float means of electrically conductive material disposed in said interior portion, said float means being free to rise on the surface of liquid refrigerant entering the interior of said sensor from the refrigerant line;

a first spaced pair of electrodes disposed in a lower interior portion of said sensor in a position such that said first electrodes will be contacted by said float means at the time a certain refrigerant level is reached in the interior of said sensor;

a first electrical circuit connected to said first pair of electrodes for providing an indication of a low refrigerant level and arranged to automatically add refrigerant to the refrigeration system as a result of electrical contact of said float means with said first pair of electrodes when the certain refrigerant level is reached;

a second spaced pair of electrodes disposed in an upper interior portion of said sensor; and a second electrical circuit connected to said second pair of electrodes for providing an indication of sufficient refrigerant having been added to the system.

3. A combination liquid refrigerant level sight gauge and alarm sensor for use in a refrigeration system having a condenser connected by a liquid refrigerant line to a throttling device comprising:

(a) a closed chamber having
  (i) a metallic lower portion having an inlet opening therethrough connected to said liquid refrigerant line adjacent said throttling device,
  (ii) a transparent vertical non-conductive tube for observing the level of a liquid in said chamber and having a lower end attached to said lower chamber portion, and
  (iii) a cap disposed over an upper end of said tube;

(b) an electrical contact disposed through and insulated from said metallic lower portion; and (c) a conductive float disposed within said chamber, said float floatable in liquid refrigerant entering said chamber from said refrigerant line, said float closing an electrical circuit between said metallic lower portion and said electrical contact when the level of such liquid refrigerant is lower than a preselected low level and opening said electrical circuit when the level of such liquid refrigerant is above said preselected low level.

4. The level gauge and alarm sensor as defined in claim 3 in which said cap is formed from conductive material and which further comprises a second electrical contact disposed through and insulated from said cap, said float closing a second electrical circuit between said cap and said second electrical contact when the level of such liquid refrigerant is higher than a preselected upper level and opening said second electrical circuit when the level of such liquid refrigerant is lower than said preselected upper level.

5. In a refrigeration system having a closed-loop refrigerant line containing a refrigerant, the line including a throttling device, an evaporator for absorbing heat from a first environment, a compressor, a condenser for releasing heat into a second environment, and a liquified refrigerant circulating portion between the condenser and the throttling device, the improvement comprising sensing means for indicating a loss of refrigerant in the system, the sensing means including a reservoir having an upper portion and a lower portion, means for connecting the reservoir in fluid communication with the liquified refrigerant circulating portion of the closed-loop refrigerant line adjacent to the throttling device so that liquified refrigerant enters the reservoir, a float in the reservoir, the float being sufficiently buoyant to float in the liquified refrigerant, detection means adjacent to the lower portion of the reservoir for detecting the presence of the float when the level of liquified refrigerant in the reservoir decreases to a predetermined level, and a control means for controlling a function when the presence of the float is detected.

6. The refrigeration system as recited in claim 5 wherein said detection means comprises a first pair of spaced electrodes disposed in the reservoir, and said float is electrically conductive, said reservoir, float, and electrodes being sized and positioned so that the float disengages said electrodes when the level of refrigerant in the reservoir is above said predetermined level, but said float engages said electrodes when the level of refrigerant in the reservoir is at or below said predetermined level.

7. The refrigeration system of claim 6 wherein said detection means further comprises a second pair of spaced electrodes disposed in the upper portion of the reservoir, the reservoir, float, and second pair of electrodes being sized and positioned so that the float disengages said second pair of electrodes when the level of liquified refrigerant in the reservoir is below a second predetermined level, and so that the float engages said second pair of electrodes to provide a separate control function when the level of liquified refrigerant is at or above the second predetermined level.

8. The refrigeration system of claim 6 wherein the function controlled by the control means comprises a signal means for signaling a loss of refrigerant when the float engages said first electrodes.

9. The refrigeration system of claim 6 wherein the reservoir includes a transparent portion for enabling a visual check of the level of liquified refrigerant in the reservoir.

10. The refrigeration system of claim 6 wherein the function controlled by the control means comprises a refrigerant supply means, said refrigerant supply means being operatively connected to said first pair of electrodes to introduce refrigerant into the system when said float engages said first pair of electrodes.

11. The refrigeration system of claim 5 wherein the function controlled by said control means comprises a signal means for signaling a loss of refrigerant when said float becomes detected by said detection means.

12. The refrigeration system of claim 5 wherein the reservoir includes a transparent portion for enabling a visual check of the level of the liquified refrigerant in the reservoir.

13. The refrigeration system of claim 1 wherein the function controlled by the control means comprises a refrigerant supply means, said refrigerant supply means being operatively connected to the detection means to introduce refrigerant into the system when the float becomes detected by said detection means.

14. The refrigeration system of claim 1 further comprising a second sensing means disposed in the refrigeration system on the opposite side of the throttling device from the first mentioned sensing means.

15. The refrigeration system as recited in claim 1 in which said detection means includes a pair of electrodes provided in an electrically isolated manner in said lower portion of said reservoir, with an electrical circuit existing with respect to said pair of electrodes, and with the settling of the float on the upper ends of said electrodes completing such circuit, so than an indication of low refrigerant condition can be provided to a remote location.

* * * * *